United States Patent [19]
Parth

[11] 3,774,185
[45] Nov. 20, 1973

[54] APPARATUS FOR DETECTING ORGANIC MATERIALS IN WATER

[75] Inventor: William H. Parth, Saginaw, Mich.

[73] Assignee: The Dow Chemical Company, Midland, Mich.

[22] Filed: Feb. 4, 1972

[21] Appl. No.: 223,668

[52] U.S. Cl............ 340/236, 73/61.1 R, 137/392, 324/61 QS, 340/239 R
[51] Int. Cl. .................................... G08b 21/00
[58] Field of Search............... 340/239 R, 244, 236; 73/231 M, 194 M, 194 E, 61.1 R; 137/392; 324/61 QS, 61 QL; 331/65

[56] References Cited
UNITED STATES PATENTS
2,392,229   1/1946   Cohen............................ 137/392 X
3,397,715   8/1968   Fathauer........................ 137/392 X
3,525,090   8/1970   Raddatz......................... 340/244 C Primary Examiner—John W. Caldwell
Assistant Examiner—Daniel Myer
Attorney—Earl D. Ayers et al.

[57] ABSTRACT

A detector device for determining the presence of organic materials in water streams, such as chemical sewers, as a result of leakage or spillage. The device comprises an upright elongated electrically insulating tube through which material from the stream is pumped. At intervals flow through the tube stops, the lighter organic material rising to the top and displacing water downwardly. A pair of spaced apart metal rings near the top of the tube act as plates of an electrical capacitor. As the level of organic material in the tube reaches the location of the rings, the dielectric change changes the electrical value of the capacitor. This change in value is detected and utilized to trigger an alarm. The position of the rings along the tube is adjustable. Using the capacitor as part of the tuned circuit of an oscillator is one means to develop an alarm signal when the oscillator is detuned when the dielectric changes near the rings.

7 Claims, 3 Drawing Figures

PATENTED NOV 20 1973

3,774,185

APPARATUS FOR DETECTING ORGANIC MATERIALS IN WATER

BACKGROUND OF THE INVENTION

This invention relates to organic materials detectors and particularly to apparatus for detecting spills or leakage of organic materials into chemical sewers or the like.

Leakage or spillage of organic materials into chemical sewers is a common problem in many chemical production plants. While treatment facilities may be sufficient to tolerate small amounts of such leakage or spillage, when the amount of organic material exceeds the amount which can be dissolved in the water a detector and alarm system are often needed in order to divert the sewer materials into a holding reservoir.

The conditions under which such a detector operates include wide temperature variations, a corrosive atmosphere, not readily accessible for repair, and need to be operated and adjusted by relatively untrained and unskilled workers. In addition the device should be mechanically rugged and, because of the number of devices likely to be needed, should be economical to make.

OBJECTS OF THE INVENTION

Accordingly, a principal object of this invention is to provide an improved reliable detector of organic materials in an aqueous stream.

Another object of this invention is to provide an improved, easy to adjust and maintain, detector of organic materials in an aqueous stream.

A further object of this invention is to provide an improved, rugged and economical to manufacture detector of organic material in an aqueous stream.

STATEMENT OF INVENTION

In accordance with this invention, there is provided an upright elongated hollow column having fluid entry means at least near to its lower end and discharge means at least near to its upper end. The upper end part is made of electrically insulating material. Means are provided for intermittently pumping an aqueous stream through said column and then holding the stream in a static condition for a predetermined interval wherein any organic material rises to the top of said column. A pair of spaced apart electrodes are coupled to the exterior of said column along the upper end part near to but below said discharge means. Each electrode serves as an electrode element of a capacitor, each electrode being coupled to means for developing a signal responsive to changes in capacity of said capacitor as organic material displaces aqueous material adjacent to said electrodes, and an alarm means actuated by said signal.

BRIEF DESCRIPTION OF THE DRAWING

The invention, as well as additional objects and advantages thereof, will best be understood when the following detailed description is read in connection with the accompanying drawing, in which.

DETAILED DESCRIPTION OF THE DRAWING

Figure 1:
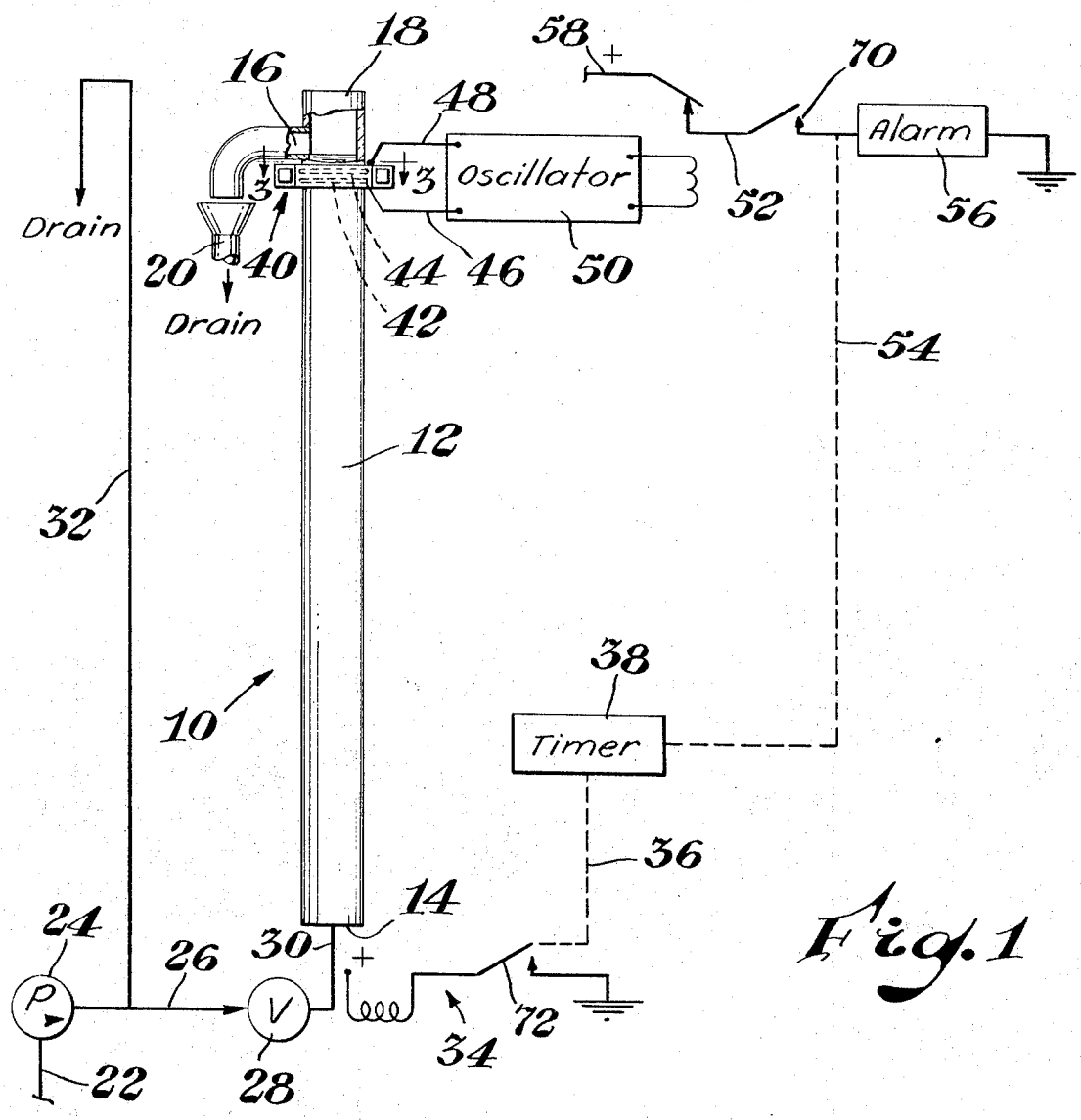
FIG. 1 is a diagrammatical view of apparatus in accordance with this invention.

Referring to the drawing, there is shown apparatus, indicated generally by the numeral 10, comprising an elongated upright tube 12 having a lower end 14, a discharge tube 16 coupled to the tube 12 near the upper end 18 thereof. The discharge tube 16 may be, for example, coupled to a drain 20 for return to an aqueous stream (not shown). A line 22 is coupled between the aqueous stream (not shown) and the input of a pump 24. A line 26 is coupled to the input side of a remotely controlled valve 28 whose output side is coupled to the lower or input end 14 of the tube or column 12 through the line 30.

Another line 32, which extends approximately as high as the top end 18 of the tube 12, is coupled to the line 26 between the pump 24 and the remotely controlled valve 28.

The line 32 is open ended and fluid passing therethrough is discharged usually to a drain.

Figure 3:
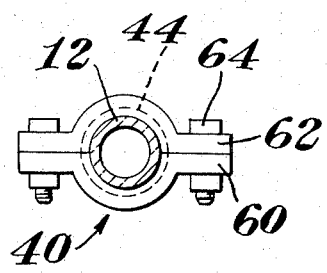
FIG. 3 is a sectional view along line 3—3 of FIG. 1.

A ring electrode assembly, indicated generally by the numeral 40, is position adjustably coupled to the upper part of the tube 12 just below the discharge level of the tube. Referring also to FIG. 3, the assembly 40 comprises half-collars 60, 62 held together around the tube 12 by means of screws or bolts 64. The ring electrodes 42, 44 are retained in spaced apart grooves along the inner peripheral wall of each half-collar. An electrical lead 46 or 48 is coupled from each electrode 42 or 44 to a capacitance sensing device such as an oscillator 50 using ring electrodes 42, 44 as a part of a tuned circuit and which draws current as a function of the capacitance represented by the ring electrodes 42, 44 and the dielectric material adjacent thereto.

A solenoid switch 52 has its electrical coil coupled to the oscillator power supply in series with a circuit which draws current as a function of the capacitance of the ring electrode capacitor. Thus, as the current changes due to a change in substance of the liquid at the part of the tube 12 adjacent to the ring electrodes 42, 44, the solenoid switch is either closed or opened.

The timer 38 is coupled indicated by dashed lines 36, 54 to switches 72, 70 respectively. When the switches 52 and 70 are closed electric circuit from a source indicated by numeral 58 passes through and actuates the alarm which, for example, may be a light or a bell.

Figure 2:
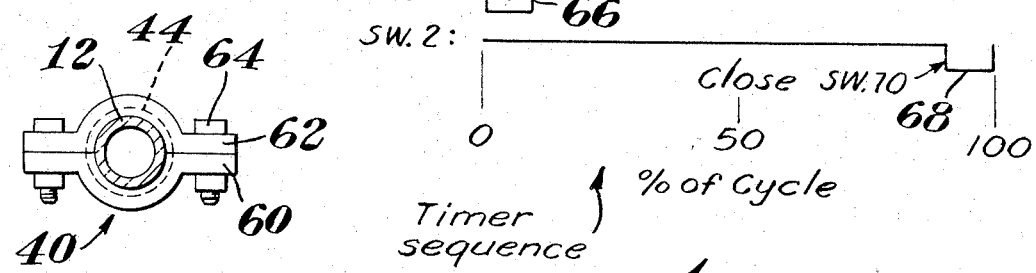
FIG. 2 is a diagram showing switch timing sequences.

FIG. 2 shows the cycling sequence of the timer 38 which may be a simple motor driven time having two switching circuits.

In operation, with the valve 28 opened, a well mixed sample of water and possible organic contaminants is pumped from a chemial sewer (not shown) through the tube 12 and the bypass line 32. After the tube is well flushed, the valve 28 closes while the pump 24 continues to operate. The continued operation of the pump 24 maintains a substantially equal pressure on each side of the valve 28 because the height of the by-pass line 32 is the same (or as near as practicable to the same) as the height of the tube 12 to the discharge part 16.

After the valve 28 closes, organic material lighter than water in the tube in excess of that dissolved in the water rises to the top of the fluid in the tube 12. The ring electrodes 42, 44, spaced about one sixteenth inch apart around the tube 12, are positioned a short distance below the discharge level of the tube 12. As the water is displaced downwardly by the rising lighter organic material, the change in dielectric constant of the liquid material adjacent to the ring electrodes 42, 44 changes the capacitance across the ring electrodes 42, 44 and results in a change in current through the electrical winding of the switch 52. Thus, with the contact of 52 closed, when the timer closes switch 70, the alarm 56 is actuated, giving a visual or audible signal, or, alternatively, controlling another system or device.

Some typical organic materials used with the device of FIG. 1 include styrene, gasoline, benzene and ethyl benzene.

It should be noted that relatively large changes in capacitance occur as the organic material displaces the water since the dielectric constant of water is approximately 80 while those of the expected organics are below 10.

The leads 46,48 are usually the inner and outer leads of a concentric cable.

The oscillator 50 is simply one type of device which may be used with the ring capacitor assembly 40. A direct reading capacitance device such as a Foxboro Capacity Dynalog recorder with switch contacts added to close at pre-set capacitance level has been successfully used.

The volume percent of organics which must be present for an alarm to occur depends upon the following:

1. The vertical position of the capacitance detector 50.
2. The geometry of the capacitance detector 50.
3. The length of the tube 12.
4. Increased sensitivity to organics can be obtained by decreasing the inside diameter of the upper portion of tube 12.

The length of the tube or column 12 in one device 10 is fifty inches. The tube 12 is made of glass. In some instances it may be desirable to make the lower part of the tube 12 of metal and have only the upper part of the tube (near the electrodes) made of electrically insulating materials.

The apparatus of this invention provides a rugged, low maintenance, economical detector for organic materials in an aqueous stream such as a chemical sewer, for example. The tube or column 12 may be disposed in a sewer or remote therefrom, with the remainder of the detection apparatus either remote or close to the tube 12. Adjustment of the sensitivity level of the device may be made easily by changing the position of the electrodes.

What is claimed is:

1. Apparatus for determining the presence of predetermined amounts of organic materials in an aqueous stream, comprising a generally upright elongated vertical hollow electrically insulating column, timer actuated valved means for controlling the flow of materials from said stream into said column, means at least near to the upper end of said column for discharging liquid from said column, capacitor electrodes, said capacitor electrodes being coupled to said column below said means for discharging liquid, said capacitor electrodes being electrically coupled to capacitance sensing means for developing an output signal on achievement of a predetermined capacitance between said electrodes, an alarm element, said alarm element being actuated in response to said output signal, timer means coupled to said alarm element whereby said alarm element may be actuated only when said timer actuated valved means is closed, and means for applying pressurized liquid from said stream to said valved means.

2. Apparatus in accordance with claim 1, wherein said capacitor electrodes are a pair of spaced apart metal rings disposed around the outer periphery of said column.

3. Apparatus in accordance with claim 1, wherein switching means is coupled to the means for actuating said alarm element, said switching means being actuated by said timer means.

4. Apparatus in accordance with claim 1, wherein said capacitance sensing means is an oscillator which utilizes said capacitor electrodes in a tuned circuit thereof.

5. Apparatus in accordance with claim 1, wherein said means for applying pressurized liquid to said valve is a pump.

6. Apparatus in accordance with claim 5, wherein bypass flow means are provided between said pump and said valve, said flow means having a discharge element disposed at least as high as the means for discharging liquid from said column.

7. Apparatus in accordance with claim 1, wherein the position of said capacitor electrodes along said column is movable.

* * * * *